United States Patent

Stasio

[15] 3,693,591
[45] Sept. 26, 1972

[54] BABY SAVER FOR TROPICAL FISH

[72] Inventor: Robert Stasio, 2302 85th St., Brooklyn, N.Y. 11214

[22] Filed: May 6, 1971

[21] Appl. No.: 140,841

[52] U.S. Cl. .................................. 119/3, 119/5
[51] Int. Cl. ............................... A01k 61/00
[58] Field of Search ............................... 119/3, 5

[56] References Cited

UNITED STATES PATENTS

| 2,711,714 | 6/1955 | Timeus | 119/5 |
| 3,095,852 | 7/1966 | Goldman | 119/3 |
| 3,327,686 | 6/1967 | Holden | 119/5 |

Primary Examiner—Aldrich F. Medbery
Attorney—Griedman & Goodman

[57] ABSTRACT

A device for separating newly born fish from other fish in a fish aquarium, the device consisting of a float supporting a generally opaque chamber-equipped frame on its underside and which carries a nesting tray spaced below the opaque frame. The frame is provided with small openings so that new-born fish may escape, from the adult fish and enter safely into the chamber-equipped frame, the openings being designed so that the new-born fish may only pass upward therethrough and cannot return downward again.

10 Claims, 4 Drawing Figures

PATENTED SEP 26 1972

3,693,591

ROBERT STASIO
INVENTOR

BY Friedman and Goodman
ATTORNEYS

ROBERT STASIO
INVENTOR

BABY SAVER FOR TROPICAL FISH

SUMMARY OF THE INVENTION

This invention relates generally to fish aquariums. More specifically it relates to fish accessories for use in a fish aquarium.

It is generally well known to those skilled in the art that when baby fish are newly born, they are subject to being eaten by adult or other fish as well as by the mother herself. This situation is objectionable particularly with ornamental fish of value such as are used in home fish aquariums.

Accordingly it is a principal object of the present invention to provide a baby saver for tropical fish aquariums which separates the newly born fish from the adult fish.

Another object is to provide a baby saver which readily attracts the baby fish thereinto so that attention by the hobbyist is not needed in accomplishing the fish separation.

Another object is to provide an automatic baby saver for tropical fish aquariums which can be made in any of various sizes so to accommodate different types of fish.

Yet another object is to provide an automatic baby saver which can be used in fisheries other than a home type tropical aquarium.

Other objects are to provide an automatic baby saver for tropical fish aquariums which is simple in design, inexpensive to manufacture, rugged in construction, easy to use and efficient in operation.

BRIEF DESCRIPTION OF THE DRAWINGS

With the above and additional object and advantages in view as will hereinafter appear, this invention comprises the devices, combinations, and arrangements of parts hereinafter described and illustrated in the accompanying drawings of a preferred embodiment in which.

DETAILED DESCRIPTION OF THE INVENTION

Figure 1:
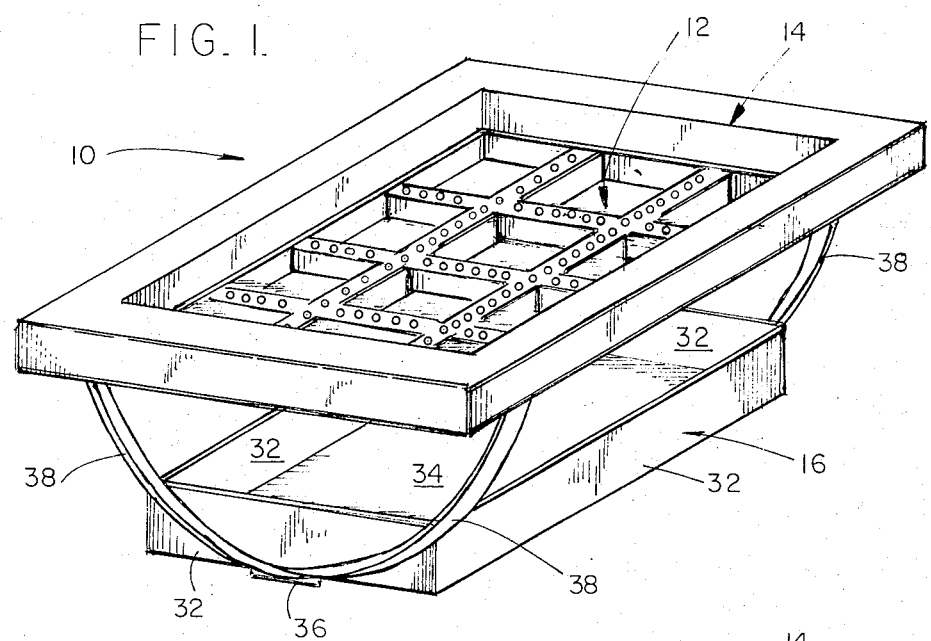
FIG. 1 illustrates a generally perspective view of the safety-housing and nesting pan operatively associated with one another pursuant to the present invention.

Referring now to the drawings, and more particularly to FIG. 1 thereof, the present invention comprises a safety-housing for new-born fish generally denoted by the reference character 10. The safety-housing 10 comprises a receptacle 12 into which new-born fish may enter immediately after they are born, and a floatation collar 14 suitably connected to the receptacle 12, such as by an adhesive or the like, so as to permit the receptacle 12 to float in water in a manner as will be further described below. Furthermore, as illustrated in FIG. 1 a nesting pan 16 is operatively associated with the receptacle 12 and floatation collar 14 also in a manner as will be further described below.

Figure 2:
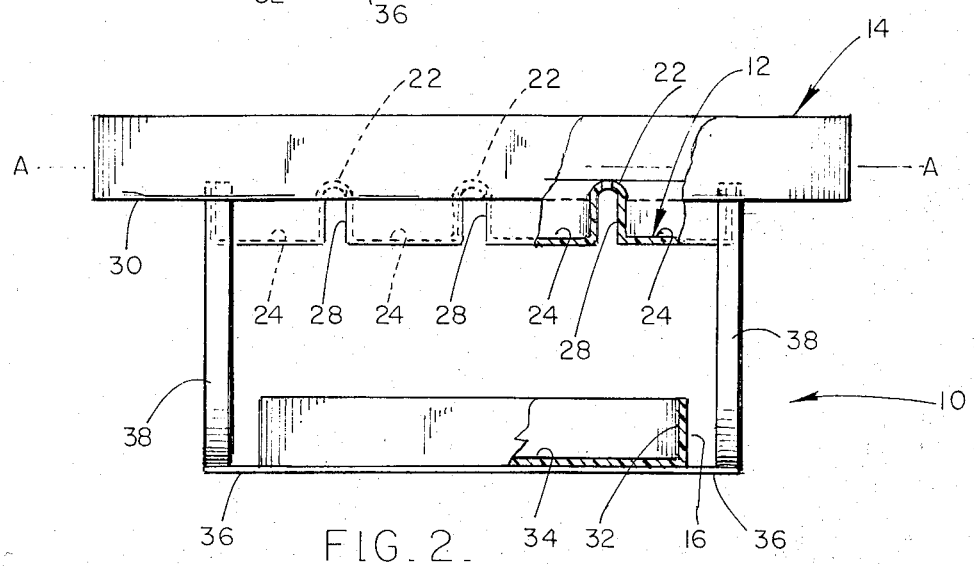
FIG. 2 illustrates a front elevational view, partly in cross-section of the safety-housing and nesting pan of the present invention.
Figure 3:
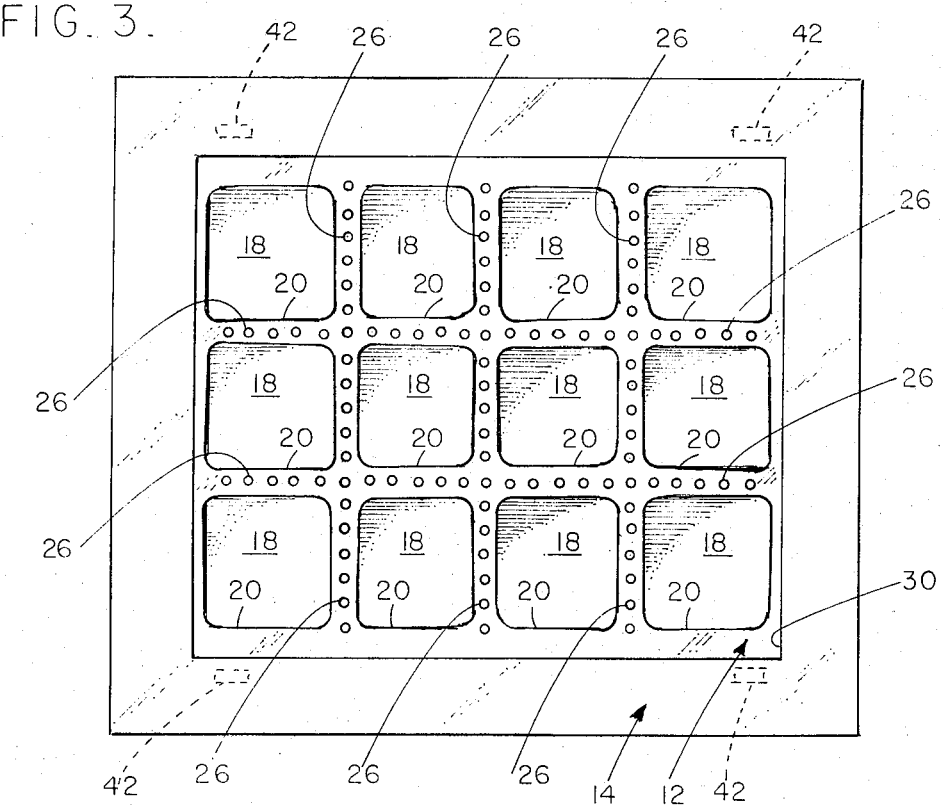
FIG. 3 illustrates a plan view of the safety-housing pursuant to the present invention and the floatation collar associated therewith.
Figure 4:
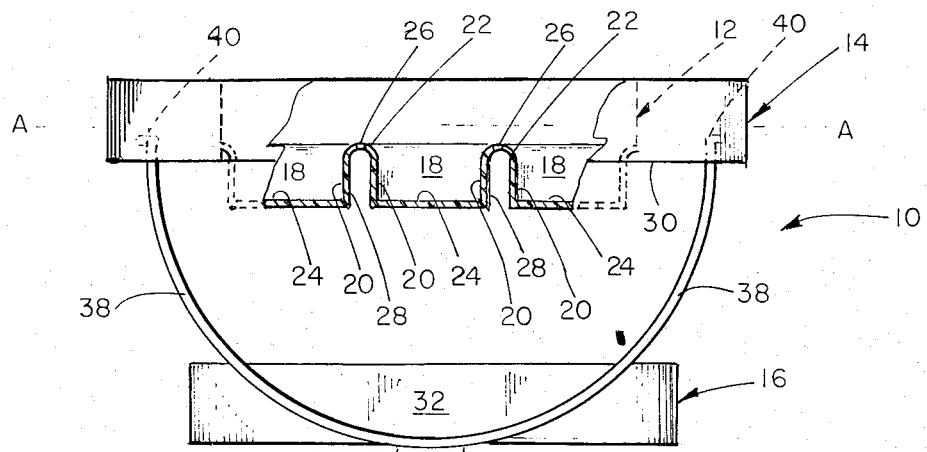
FIG. 4 illustrates a side elevational view, partly in cross-section, of the safety-housing and nesting pan pursuant to the present invention.

Referring now to FIGS. 1 and 3, the receptacle 12 is provided with a plurality of chambers 18 which are separated from one another and defined by the vertical walls 20. Each chamber 18 is separated from an adjoining chamber through the intermediary of a horizontally extending transition portion 22. In this respect, the horizontally extending transmission portions 22 integrally interconnect the vertically extending walls 20 of adjoining chambers 18. The transition portions 22 define the uppermost portions of the chambers 18 which are open and communicate with the external environment. Each of the chambers 18 is also provided with a bottom portion 24 which in cooperation with the walls 20 acts to define a partially open enclosure, i.e. the chambers 18, in which new-born fish may be sustained. Each of the transition portions 22 is provided with a plurality of spaced openings 26 which extend in an array generally surrounding each of the chambers 18. As illustrated most clearly in FIGS. 2 and 4, each of the chambers 18 is separated from the others through the intermediary of the transition portions 22 and thus the walls 20 in cooperation with the transition portions 22 act to define a network of channels 28 which communicate with the openings 26 along the underside of the receptacle 12.

The floatation collar 14 which may be generally characterized as an annular member of rectangular extent is constituted of styrofoam or the like so that it may readily float in a water-carrying aquarium. The receptacle 12 is suitably connected to the floatation collar 14 at the underside 30 of the latter such as by an adhesive or other conventional means. Thus, when the floatation collar 14 is placed into a body of water, the lowermost portion or underside 30 thereof will be partly submerged beneath the surface level of the water, the latter generally indicated by the line A—A in FIG. 2, and, therefore, the entire receptacle 12 will be fully submerged immediately proximate the surface level of the water.

The nesting pan 16 includes four side walls 32, a closed bottom portion 34 and an open top portion opposite the closed bottom portion 34. Al illustrated most clearly in FIGS. 1, 2 and 4, the nesting pan 16 is furthermore provided with a pair of oppositely located bracket portions 36 to which is connected two spaced pairs of resilient limbs 38. The limbs 38 are generally constituted of a flexible plastic or the like and terminate respectively in free ends each provided with a transverse lug 40. As illustrated most clearly in FIG. 3, the floatation collar 14 is provided with a plurality of spaced recesses 42 each having an inner ledge (not shown) for cooperating with the transverse lugs 40 respectively of the limbs 38.

In order to enhance the appearance of a natural environment and to attract the female fish into the confines of the nesting pan 16, the latter may be provided with either natural or artificial replica of plant life so as to enhance the privacy for the female fish who is ready to spawn her eggs. In this manner, because of the provision or in effect the immediate proximity of the nesting pan 16 relative to the receptacle 12 the newly born fish as they are born will readily ascend upwardly into the channels 28 provided on the underside of the receptacle 12 and enter into each of the channels 18 through the intermediary of the openings 26 provided in the transition portions 22 respectively.

In order to enhance the effectivness of the safety-housing 10 pursuant to the present invention, or, in other words, ensure that the newly born fish will ascend upwardly to enter into the receptacle 12, the latter is generally provided as being opaque in nature so as to more prominently expose light entering through the openings 26 to thereby more reliably and effectively attract the newly born fish upwardly so that they may enter into the receptacle 12 through the prominently exposed openings 26.

The nature of the openings 26 is such that the new-born fish may readily pass therethrough, however, the adult fish or female fish giving birth to the new-born fish is prevented from entering into the receptacle or chambers 18. Because of the provision of the openings 26 in the transition portions 22 and the rather minimal distance between the upper-most surface of the transition portions 22 and the water surface level there is little or no tendency for the new-born fish to attempt passing from one chamber to the next or above the transition portions 22 so as to be capable of passing back into the aquarium through the openings 26. Thus, because of the relatively great depth of the bottom portion 24 of each of the chambers 18 relative to the water surface level as opposed to that rather shallow depth of the transition portions 22 relative to the water surface level the new-born fish will remain in the chambers 18 without attempting to return into the aquarium through the openings 26. The walls 20 may be, therefore, characterized as safety means generally isolated from the openings 26.

It is significant to point out that the rectangular periphery of the receptacle 12 adjacent the collar 14 is not provided with openings 26 so as to permit the new-born fish to safety migrate thereto, the latter periphery being a location of minimal suction produced by the inflow and outflow of water through the openings 26, inasmuch as new-born fish inherently seek "safe-water" in which to hide.

Numerous alternations of the structure herein disclosed will suggest themselves to those skilled in the art. However, it is to be understood that the present disclosure relates to a preferred embodiment of the invention which is for purposes of illustration only and not to be construed as a limitation of the invention.

What is claimed is:

1. A combination comprising a new-born fish floating housing, said housing including floatation means for floating said housing in water, said housing including an upper portion for being exposed above the water and a lower portion for being submerged in the water, said housing being provided with a receptacle therein for being submerged in the water, a nesting pan carried by said housing for being submerged in the water, said nesting pan being spaced below said receptacle, said receptacle including inlet means through which new-born fish from said nesting pan may enter.

2. The combination as claimed in claim 1 wherein said floatation means includes a floatation collar having an extent generally surrounding said receptacle.

3. The combination as claimed in claim 2 wherein said floatation collar is constituted of styrofoam.

4. The combination as claimed in claim 2 wherein said receptacle includes an undersurface, said undersurface including means for defining channels in network array and communicating with said inlet means.

5. The combination as claimed in claim 4 wherein said receptacle includes means for defining a plurality of chambers for confining new-born fish therein, and transition means for isolating said chambers from one another, said transition means having a plurality of openings in communication with said channels and constituting said inlet means through which new-born fish may enter into said chambers.

6. The combination as claimed in claim 5 wherein said openings are of a sufficient size which readily permits new-born fish to pass therethrough and yet of insufficient size for permitting adult fish to pass therethrough.

7. The combination as claimed in claim 5 wherein said receptacle is generally opaque for prominently exposing light passing through said openings and attracting new-born fish thereto.

8. The combination as claimed in claim 5 wherein said receptacle in cross-section includes a plurality of inverted U-shaped extents constituting said means for defining said plurality of channels on the undersurface of said receptacle, each of said inverted U-shaped extents including an open bottom portion most proximate said nesting pan and facing the latter, each of said inverted U-shaped extents including a generally closed upper portion in which is provided said openings and constituting said transition means which isolates said chambers from one another.

9. The combination as claimed in claim 8 wherein said nesting pan includes a plurality of resilient limbs each terminating in a free-end portion, said floatation collar having a plurality of recesses for receiving the free-end portions of said limbs respectively.

10. The combination as claimed in claim 9 wherein said limbs each have an elongate extent spacing said nesting pan from said receptacle in parallel relation with the latter, said nesting pan including an upper open portion communicating with said channels on the undersurface of said receptacle.

* * * * *